US008590786B2

(12) United States Patent
Schueller et al.

(10) Patent No.: US 8,590,786 B2
(45) Date of Patent: Nov. 26, 2013

(54) SYSTEM AND METHOD FOR USING A MOBILE DEVICE TO LOCATE A FOLLOWED ITEM IN A RETAIL STORE

(75) Inventors: Dana L. Schueller, Chicago, IL (US);
Marisa Lynne Brillhart, Chicago, IL (US); Dan S. Grimm, Chicago, IL (US);
John Johnson, Charlotte, NC (US);
Shubham Agarwal, Schaumburg, IL (US)

(73) Assignee: Sears Brands, L.L.C.

( * ) Notice: Subject to any disclaimer, the term of this patent is extended or adjusted under 35 U.S.C. 154(b) by 102 days.

(21) Appl. No.: 13/086,903

(22) Filed: Apr. 14, 2011

(65) Prior Publication Data

US 2011/0191207 A1    Aug. 4, 2011

Related U.S. Application Data

(63) Continuation-in-part of application No. 12/850,722, filed on Aug. 5, 2010, which is a continuation-in-part of application No. 12/038,315, filed on Feb. 27, 2008, now Pat. No. 7,963,441.

(60) Provisional application No. 60/920,063, filed on Mar. 26, 2007.

(51) Int. Cl.
*G06K 15/00* (2006.01)

(52) U.S. Cl.
USPC ........................................................ 235/383

(58) Field of Classification Search
USPC ........................ 235/379, 383; 705/26.8, 26.9
See application file for complete search history.

(56) References Cited

U.S. PATENT DOCUMENTS

| | | | |
|---|---|---|---|
| 5,640,193 A | 6/1997 | Wellner | |
| 5,978,773 A | 11/1999 | Hudetz et al. | |
| 5,979,757 A | 11/1999 | Tracy et al. | |
| 6,049,835 A | 4/2000 | Gagnon | |
| 6,141,666 A | 10/2000 | Tobin | |
| 6,199,048 B1 | 3/2001 | Hudetz et al. | |
| 6,304,855 B1 * | 10/2001 | Burke | 705/26.9 |
| 6,616,049 B1 * | 9/2003 | Barkan et al. | 235/472.03 |
| 6,636,837 B1 * | 10/2003 | Nardozzi et al. | 705/7.29 |
| 6,769,018 B2 | 7/2004 | Gagnon | |
| 6,813,608 B1 * | 11/2004 | Baranowski | 705/6 |
| 6,912,507 B1 * | 6/2005 | Phillips et al. | 705/7.13 |
| 6,954,735 B1 * | 10/2005 | Djupsjobacka et al. | 705/26.8 |

(Continued)

FOREIGN PATENT DOCUMENTS

| | | |
|---|---|---|
| JP | 2002-170028 A | 6/2002 |
| WO | 01/97105 | 12/2001 |
| WO | 02/33518 | 4/2002 |
| WO | 2006/126996 | 11/2006 |

*Primary Examiner* — Jamara Franklin
(74) *Attorney, Agent, or Firm* — McAndrews, Held & Malloy, Ltd.

(57) ABSTRACT

A computing device receives information that is representative of a location of a mobile device and uses the information representative of the location of the mobile device to select one or more maps corresponding to a retail establishment. The computing device also receives information that is representative of a customer and uses the information representative of the customer to place on the one or more selected maps indicia indicative of one or more locations within the retail establishment at which one or more items determined to be of interest to the customer are located. The one or more selected maps with the indicia are then provided to the mobile device for display.

30 Claims, 8 Drawing Sheets

(56) References Cited

U.S. PATENT DOCUMENTS

| | | |
|---|---|---|
| 6,993,573 B2 | 1/2006 | Hunter |
| 7,024,378 B2 | 4/2006 | Razumov |
| 7,054,832 B1 | 5/2006 | Vallabh |
| 7,156,311 B2 | 1/2007 | Attia et al. |
| 7,231,380 B1 * | 6/2007 | Pienkos ................................ 1/1 |
| 7,363,253 B2 * | 4/2008 | Forbis et al. ................. 705/26.8 |
| 7,634,295 B2 | 12/2009 | Hayaashi et al. |
| 2005/0125301 A1 | 6/2005 | Muni |
| 2007/0162350 A1 | 7/2007 | Friedman |
| 2008/0082424 A1 | 4/2008 | Walton |
| 2010/0241525 A1 * | 9/2010 | Aguera y Arcas et al. ..... 705/27 |

* cited by examiner

SYSTEM AND METHOD FOR USING A MOBILE DEVICE TO LOCATE A FOLLOWED ITEM IN A RETAIL STORE

RELATED APPLICATION INFORMATION

This application claims the benefit of and is a continuation-in-part of U.S. application Ser. No. 12/850,722, filed on Aug. 5, 2010, which application is related to U.S. application Ser. No. 12/038,315, filed on Feb. 27, 2008, which application claims the benefit of U.S. Application No. 60/920,063, filed on Mar. 26, 2007, the disclosures of which are incorporated herein by reference in their entirety.

BACKGROUND

The descriptions that follow generally relate to retail services and, more particularly, describe a system and method for providing self service checkout and item delivery using a mobile device as well as a system and method for using a mobile device to follow a price for an item.

In the art systems and methods for using mobile devices in connection with retail services are known. For example, PCT Published Application No. WO 02/33518 generally describes a system in which a barcode representing a URL is imprinted on a page of printed material. A scanner (which can be a web enabled cellular telephone) is used to scan the barcode and translate the barcode into the URL address. A browser of the scanner uses the URL address to connect to a web page which contains further information related to the subject matter found on the printed material. The web page may also provide for the purchase of an item or service.

US Published Application No. 2005/0125301 generally describes a system that enables a user to instantly purchase items using a camera equipped mobile device, such as a cellular telephone. To purchase an item, a user utilizes the mobile device to scan a barcode for the item as it is displayed on a video screen. The barcode information and user information is then sent to a vendor server. The vendor server utilizes the user information to authenticate the user and to look up the user's payment and account information. This information is then passed to a transaction system by the vendor server in order to complete a transaction for the item.

JP Published Application No. 2002/170028 generally describes a system that allows a user to receive an electronic coupon on a mobile device, such as a cellular telephone, by accessing the Web using the mobile device.

PCT Published Application WO 01/97105 generally describes a system in which a mobile device with a bar code scanner, such as a cellular telephone, is used to scan a barcode associated with an advertisement to access a web page having item information and/or to purchase an item via the web.

U.S. Pat. No. 7,156,311 generally describes a cellular telephone application that decodes an image of a barcode, taken with a digital camera of the cellular telephone, to obtain barcode information that is, in turn, used to access web content that is associated with the barcode information.

U.S. Pat. No. 5,640,193 generally describes a system in which a device, equipped with a scanner, is used to read marks on an object, e.g., a barcode. The device then transmits a request to a server which includes data related to the read marks and the server responds by providing to the device multimedia information about the object.

U.S. Pat. No. 6,993,573 generally describes a system in which a cell phone is used to capture an image of a barcode and the cell phone uses the image to issue a URL request. The URL request is transmitted to a server and the server returns to the cell phone an information URL. The cell phone then transmits the information URL to an information server and in response receives content that is associated with the scanned barcode.

U.S. Pat. No. 6,199,048 generally describes a system in which a device reads a "data carrier modulated with an index" (e.g., a UPC label) and which uses the index to access a pointer to a remote computer. The pointer is then used to establish communication with the remote computer.

U.S. Pat. No. 5,978,773 generally describes a system in which a device reads an indicia provided on an ordinary article of commerce (e.g., a UPC label) and which uses the indicia to retrieve a network address that has been associated with the indicia.

U.S. Pat. Nos. 6,769,018 and 6,049,835 generally describe a system in which "jump codes" are published. A published "jump code" is entered at a first Internet location and the first Internet location converts the "jump code" to a URL address.

Various systems and methods for providing retail pickup services are also known in the art. For example U.S. Pat. No. 7,024,378 generally describes a method for providing vehicle pick-up service to a customer. The method involves a customer providing ID information to an "identification and control station" upon arriving at the pick-up facility/parking lot. The ID information may be read from a card, may be provided on a purchase receipt, etc. After the customer's ID information is provided, the customer is assigned a parking space and the goods ordered by the customer are delivered to that parking space.

U.S. Pat. No. 7,054,832 generally describes a method for providing vehicle pick-up service to a customer. The method involves a customer providing ID information to a "customer detection and identification station" upon arriving at the pick-up facility/parking lot. The ID information may be read from a card, a tag, etc. or may be keyed into "an input device." Upon providing the ID information, the customer may be assigned a parking space to which the goods ordered by the customer will be delivered. Alternatively, the customer can select a parking space and provide their ID information to the "customer detection and identification station" that is associated with the parking space selected by the customer.

PCT Published Application No. WO 2006/126996 generally describes a method for providing vehicle pick-up service to a customer. The customer is assigned a PIN and, once the customer arrives at the pick-up facility, the customer enters their PIN at a pick-up portal to receive the goods that were ordered/purchased by the customer.

Still further, various systems and methods are known for tracking the price of an item or service. For example, yapta.com provides an online website whereby a user can find a flight and thereafter track prices for the flight before electing to buy a ticket for the flight. To locate a flight for the purpose of tracking the price of flight tickets, the user enters into the yapta.com system flight information such as departing airport, arriving airport, departing time and date, and returning time and date. Similarly, websites such as easypricetracker.com allow a user to search for a particular item, for example by means of text entry, and to setup alerts whereby the easypricetracker.com system will email the user if the price drops.

SUMMARY

Described hereinafter is a system and method for providing self service checkout and item delivery using a mobile device as well as a system and method for using a mobile device to follow a price of an item and/or service (hereinafter individually and collectively referred to as "an item"). To this end, the system and method involves using a mobile device, such as a cellular telephone, to obtain information that is representative of an item. This information may be a photograph of the item or information obtained by scanning information carrying indicia associated with the item, such as a barcode.

The obtained information representative of the item may then be used to redirect a browser of the mobile device to a first web/WAP page having information related to the item, the first web/WAP page having a link that is activatable to allow for the purchase of the item. In response to activation of the link, the mobile device is caused to display a second web/WAP page that provides a means for the user to specify a method for paying for the item, such as by using an e-commerce like wallet, via a customer-service representative, etc., and a third web/WAP page that provides a means for the user to specify a method by which the item is to be picked up/checked out/delivered to the user, such as at home, in-store, at an in-car pickup facility, etc.

The obtained information representative of the item may also be used to present on the mobile device a page by which a user can establish parameters for following the price of the item.

A better understanding of the objects, advantages, features, properties and relationships of the system and method will be obtained from the following detailed description and accompanying drawing which sets forth illustrative embodiments which are indicative of the various ways in which the principles of the system and method may be employed.

BRIEF DESCRIPTION OF THE DRAWINGS

For a better understanding of the systems and methods described hereinafter reference may be had the following drawings in which.

DETAILED DESCRIPTION

Referring now to Figures, a system and method for providing services that are tied to a mobile device, such as self service checkout and item delivery and price following are hereinafter described. As will become apparent, the system and method provides for a user to utilize a mobile device to obtain an item photograph and/or information from various forms of information carrying indicia, such as a barcode, to, among other things, purchase an item and/or service, specify purchase delivery options, and/or follow the price of an item. While the system and method will be particularly described in the context of a cellular telephone 10, it will be appreciated that the invention may be practiced using any type of mobile device having the ability to scan or photograph an image, the ability to perform network communications, and the ability to display data, such as Web/WAP pages, received via the network.

Figure 1:
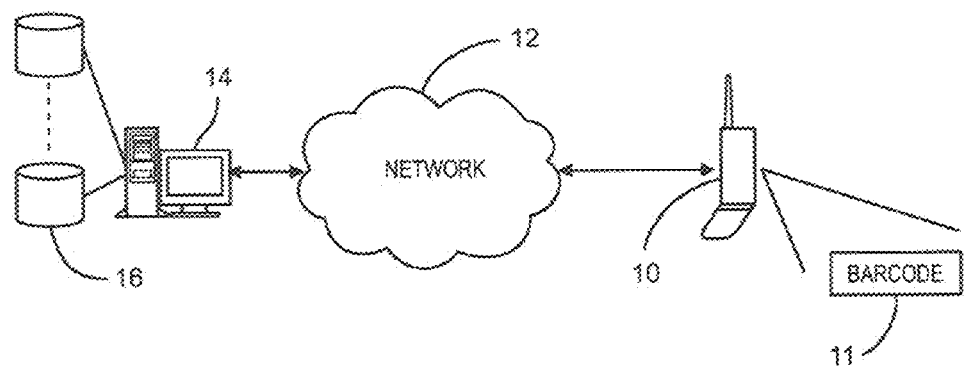
FIG. 1 illustrates an exemplary system in which the principles of the subject invention may be employed.

To facilitate use of the cellular telephone 10 within the system, generally illustrated in FIG. 1, the cellular telephone 10 includes a means to obtain information from the information carrying indicia 11. To this end, the cellular telephone 10 may include, for example, conventional barcode scanner technology or a camera and associated image processing technology as described in U.S. Pat. No. 7,156,311. Still further, the cellular telephone 10 may include convention RFID reading technology. Thus, it will be appreciated that the information carrying indicia 11 may include any form of machine-readable code having either a public standard encoding or a proprietary encoding and the cellular telephone 10 will use the technology that is appropriate to access the information carried by the particular form of information carrying indicia that is being employed within the system.

Figure 2:
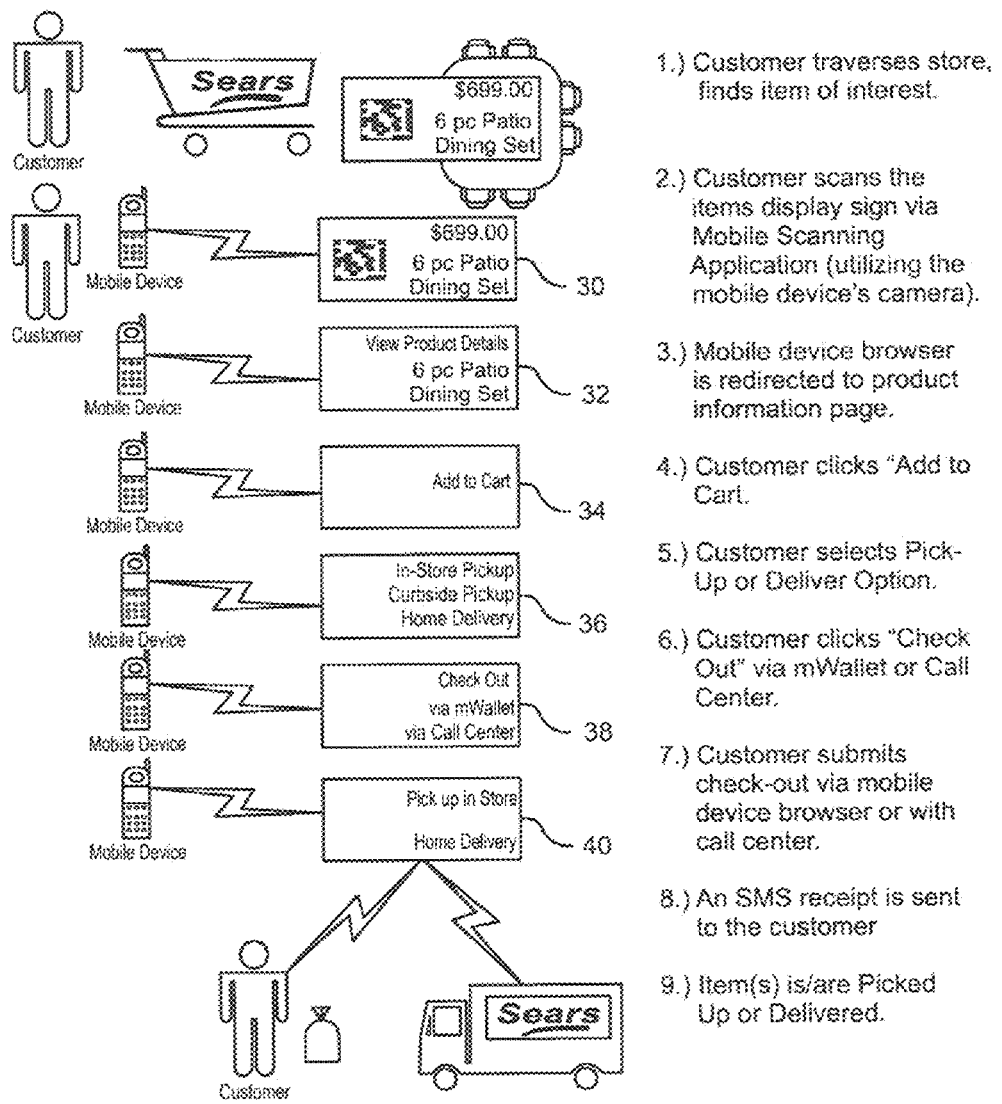
FIGS. 2-3 illustrate an exemplary method for providing self service checkout and item delivery using a mobile device.
Figure 3:
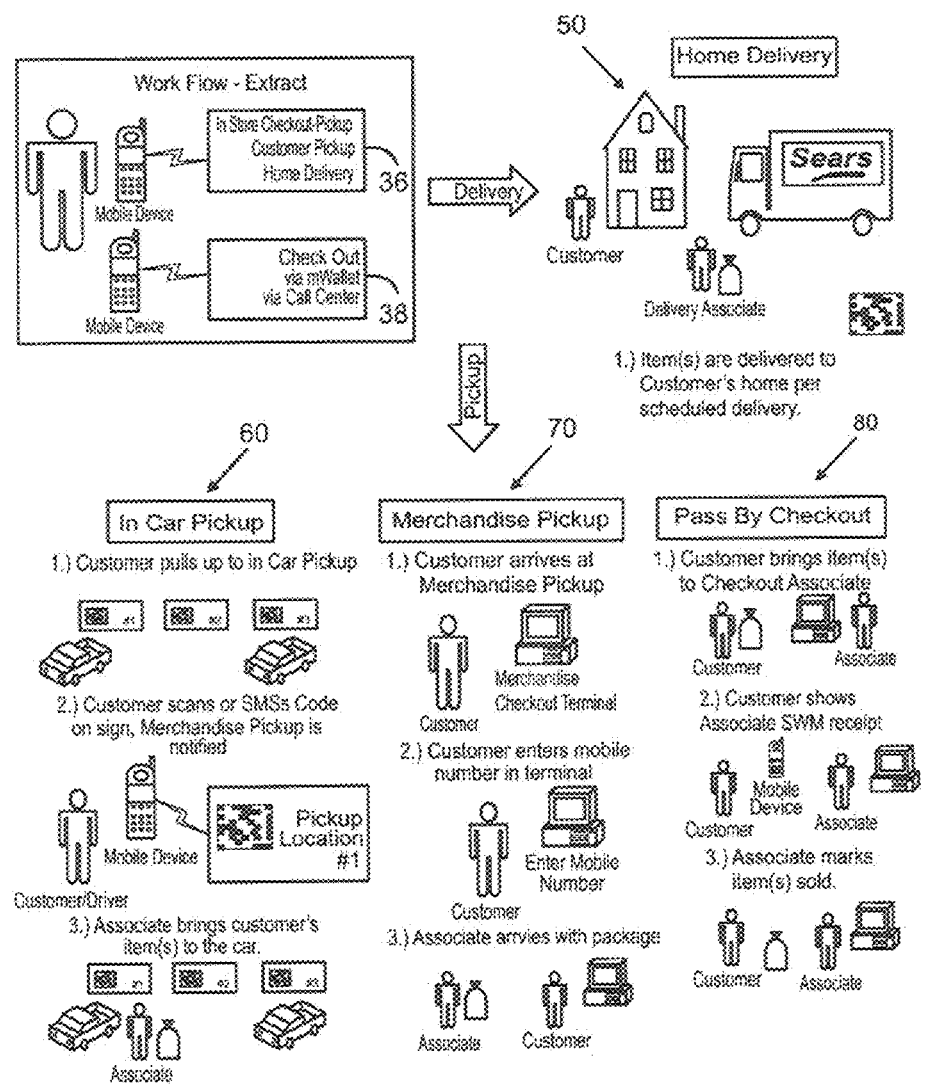

By way of particular example illustrated in FIGS. 2-3, to scan a barcode 11 a user may utilize a cellular telephone 10 having an attached or embedded digital camera. In this example, the user would launch an appropriate barcode imaging application that has been downloaded onto the cellular telephone 10 and use the digital camera to capture an image of the barcode 11. Once the barcode image 11 has been acquired by the cellular telephone 10, the barcode imaging application will function to decode the barcode to thereby extract information from the barcode. The information extracted from the decoded barcode may then be sent via a network 12 where it is routed to an appropriate server 14, having one or more associated data repositories 16, where it is further processed as discussed further below.

To provide for the downloading of a required imaging application into the cellular telephone 10 it is contemplated that a user may be presented with a display, for example within a retail establishment, on a Web/WAP (Wireless Access Point) page, in an SMS message, etc., which advertises the services provided by the subject invention. Within this advertising, the user could be further instructed to send a specified SMS message, for example "scan," to a specified SMS address. In response to the sending of such a message, the system may provide to the cellular telephone 10 a reply message which includes a WAP link which the user may activate, i.e., click on, to "opt-in" to the system and thereby install the imaging application upon their cellular phone 10. In connection with the installation of the imaging application upon the cellular phone 10 of the user, the system may additionally provide to the user instructions on use of the system, e.g., how to "scan" indicia that may be found on items such as price sheets, circulars, catalogs, display signs, monitors, price tags, etc. It will also be appreciated that, in certain circumstances, a required imaging application may be pre-installed on the cellular phone 10 of a user and pre-installed mobile devices may be on hand in retail outlets for the convenience of the users.

Once the cellular phone 10 of a user is setup as required to capture information from an information carrying indicia 11, the user may utilize the cellular phone to achieve various results upon encountering an information carrying indicia 11. For example, as illustrated in FIGS. 2-3, upon encountering an information carrying indicia 11 that is of interest to a user, for example a barcode that has been associated with an item at a retail establishment, the user may launch the imaging application on their cellular phone 10 and proceed to scan or capture the information carried by the information carrying indicia 11. Once the cellular phone 10 has captured the information from the information carrying indicia 11 that is of interest to the user, e.g., display 30, the system will function to use the information, for example as described in U.S. Pat. No. 7,156,311, to redirect a browser application of the cellular phone 10 to a desired Web/WAP page. In the illustrated example, the user may be first presented with a Web/WAP page 32 having information for the item that was associated with the information carrying indicia 11 that was scanned, e.g., an image of the item, availability of the item, price of the item, textual description of the item, etc. Furthermore, within the illustrated example, the Web/WAP page 30 presented to the user may be provided with further links to allow the user to send the Web/WAP page (or information related to the item) to another user, for example via email or SMS, to access price comparison information for the item and/or to request a price following for the item 402, to view further information for the item or other items such as upsell items related to the item, to add to a shopping list, to purchase the item, e.g., to "add to cart," etc.

In the event that user elects to purchase an item that is being viewed by the user on their cellular phone 10, for example, by the user activating the "add to cart" link 34, the system will respond by redirecting the browser application of the cellular device 10 to a further Web/WAP page which, in this example, presents to the user the contents of their shopping cart, i.e., a Web/WAP that informs the user as to the items that the user has indicated a desire to purchase. In connection with the item purchase process, the system may additionally present to the user a Web/WAP page 36 which allows the user to select a desired delivery option for the item, e.g., in store pick-up 60/70/80, home delivery 50, etc., as well as a Web/WAP page 38 which allows the user to select a desired payment option, e.g., to pay via a payment option already registered with the system (e.g., using a "M-Wallet" option), to pay via interactions with a customer service representative, etc. It will be appreciated that the Web/WAP pages 36 and 38 may be embodied on the same Web/WAP page without limitation. Once the item purchase process has been completed by the user, e.g., payment and the ability to deliver has been verified by the system using conventional methods, the system may then provide to the cellular phone 10 of the user an order confirmation (which may also indicate a time of availability for item pick-up if specified by the user as a delivery option) as well as an SMS receipt 40.

To then pick-up a purchased item if so specified by the user, the user may simply use the confirmation/receipt and/or their cell phone number in connection with a kiosk driven item pickup procedure 70 as described in, for example, U.S. Pat. No. 6,439,345. It will also be appreciated that, by providing a confirmation/receipt to the cellular phone 10 of the user, the user may be provided with an option to obtain item off the shelf 80 whereupon the user may then simply show the confirmation/receipt with the item(s) purchased to a sales associate to thereby exit the retail establishment.

In the event a user elected to pickup a purchased item using an in-car pickup process 60, the user may further use their cellular phone 10 to inform the system when they are ready for delivery of the item(s) purchased. For example, when the user arrives at the pick-up facility, the user may scan a barcode that has been affixed to a parking spot, SMS a message as directed by a sign associated with a parking spot, etc. to thereby notify the system that they are ready for item pick-up. Generally, the information provided to the system will include the parking spot in which the user is located as well as information by which the prior purchase history of the user may be accessed, e.g., the cell-phone number of the user. The system will then use the information that is provided from the cellular telephone 10 to thereby deliver to the vehicle of the user the appropriate purchased items.

As will be appreciated, via use of the described scanning application in any location, such as a home, a store of a third party retailer, etc, a user may be presented with a web page that provides to the user the host retailer's information for that item or an item determined by the host retailer to be similar thereto (both individually and collectively referred to herein as the item) such that, from any location, the user may purchase the item from the host retailer, schedule the purchased item for delivery from or pickup at a location of the host retailer, etc.

Figure 4:
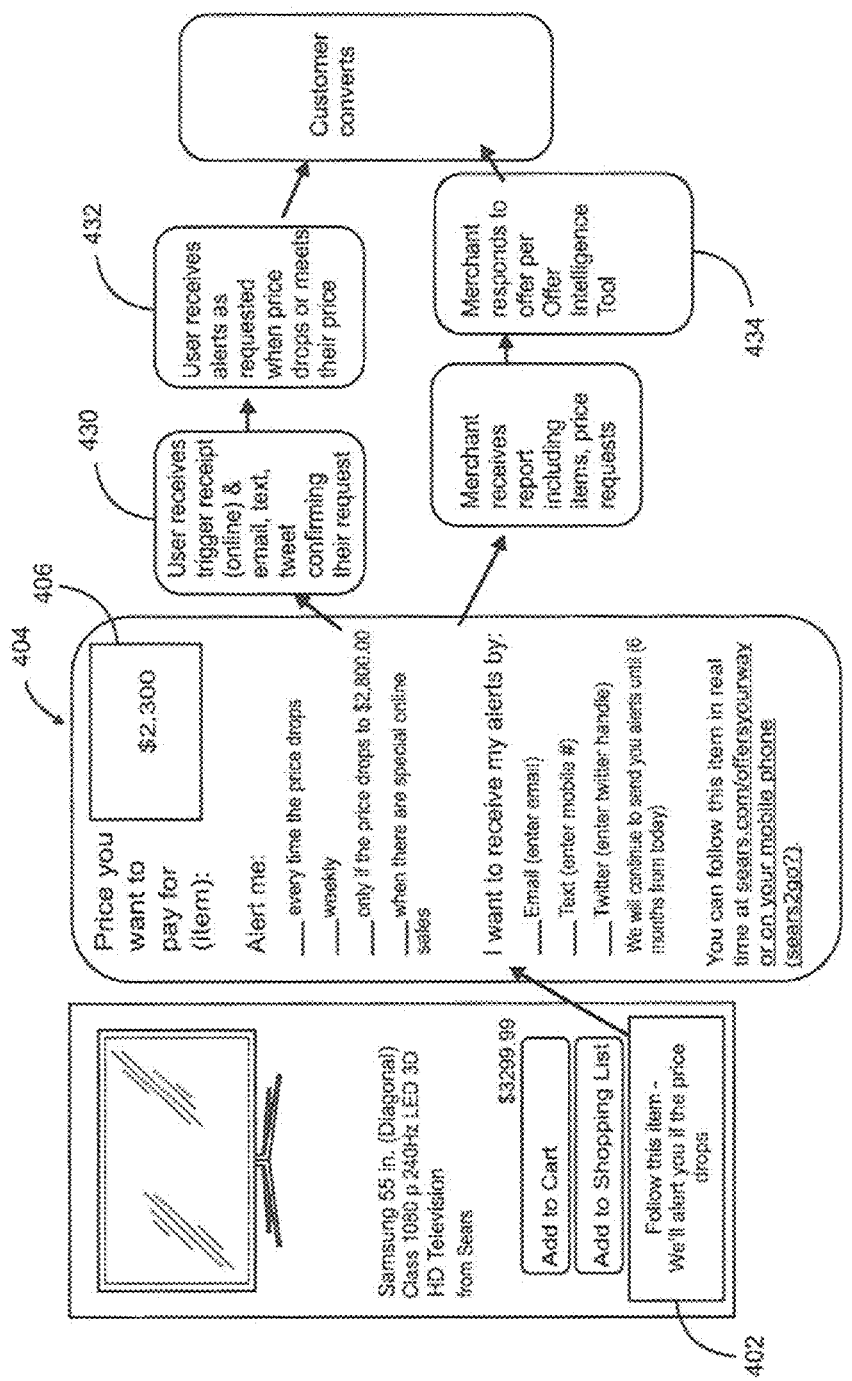
FIGS. 4 and 5 illustrates an exemplary method for providing a price following service to a user of a mobile device.

In the event that user elects to following a price for the item, for example by the user clicking on a displayed "follow this item" icon 402, the system will respond by redirecting the browser application of the cellular device 10 to a further Web/WAP page 404, such as illustrated in FIG. 4, by which, in this example, the user is provided a means to setup one or more parameters for following the price of the item corresponding to the indicia read or photograph taken through use of the cellular device 10. By way of example only, the user can specify 406 a price that the user would like to pay for the item and can request that price alerts related to the price of the item be sent according to one or more of: every time the price drops, weekly; only if the price falls below the price specified by the user (as set above); when there are special sales for the item (whether online or at a store); and the like. etc. In connection with the establishment of these price alert notification parameters, the user may also inform the system of one or more addresses to which such price alert notifications are to be sent to the customer, for example, via an email message (with the user providing an email address if necessary), via a text message (with the user providing a mobile number if necessary), via a social networking message (with the user providing a social networking username if necessary), etc. Once established, the price notification service can be set to execute for a predetermined period of time (such as six months), for a user specified period of time, until such time as the system detects that the user purchases the item, and/or for as long as the user does not request a cancellation of the notification service. In addition, once the price notification service has been established through use of the mobile device 10, the information pertaining thereto may be provided to a centralized system whereby the user can modify the established notification parameters, follow the price of the item in real time, purchase the item, etc. by means of a .com website that is associated with the host retailer.

Figure 6:
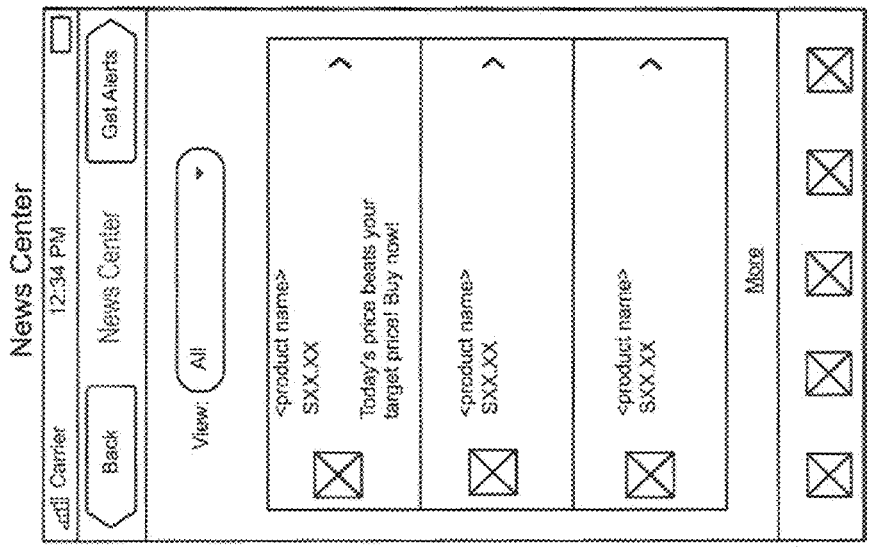
FIGS. 6 and 7 illustrate exemplary screen shots of mobile application for providing price following information to the user of the mobile device.
Figure 7:
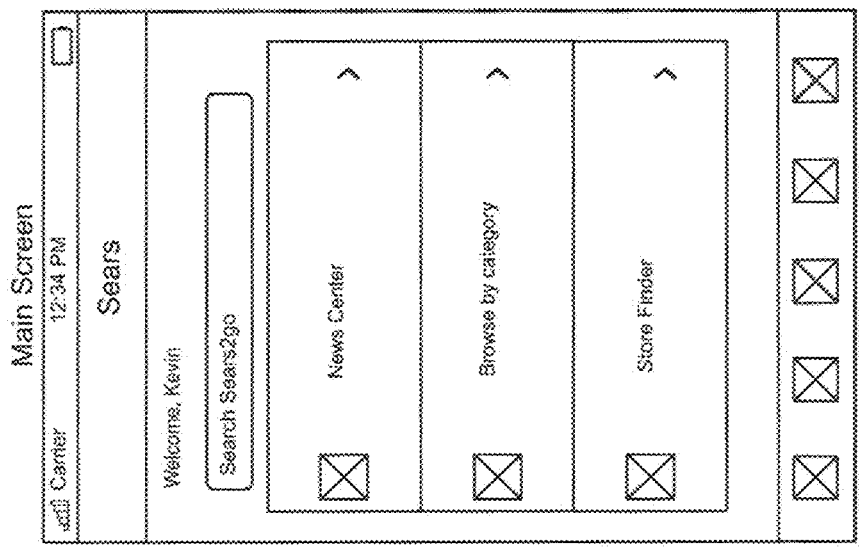

After the user completes and submits the price notification parameter setup page 404 to the system of the host retailer 421, the user may receive a confirmation 430 that the price notification has been setup with the host retailer system and the host retailer system will proceed to issue notifications according to the established notification parameters 432. During the period of time that the item notification event is active, the host retailer system may also function to provide to the user, via one or more of the established notification channels, additional information concerning the item, such as posted reviews (by "social network" friends of the user and/or others), news related to the item, etc. By way of example only, FIGS. 6 and 7 illustrate a mobile application having a "news center" by which a customer can access price alerts for one or more items as establish by the customer as well as any other news type alerts that may be provided by the system. As desired, the host retailer system may also be setup to respond 434 to the price established by the customer during the notification setup process as further illustrated in FIG. 5.

Figure 5:
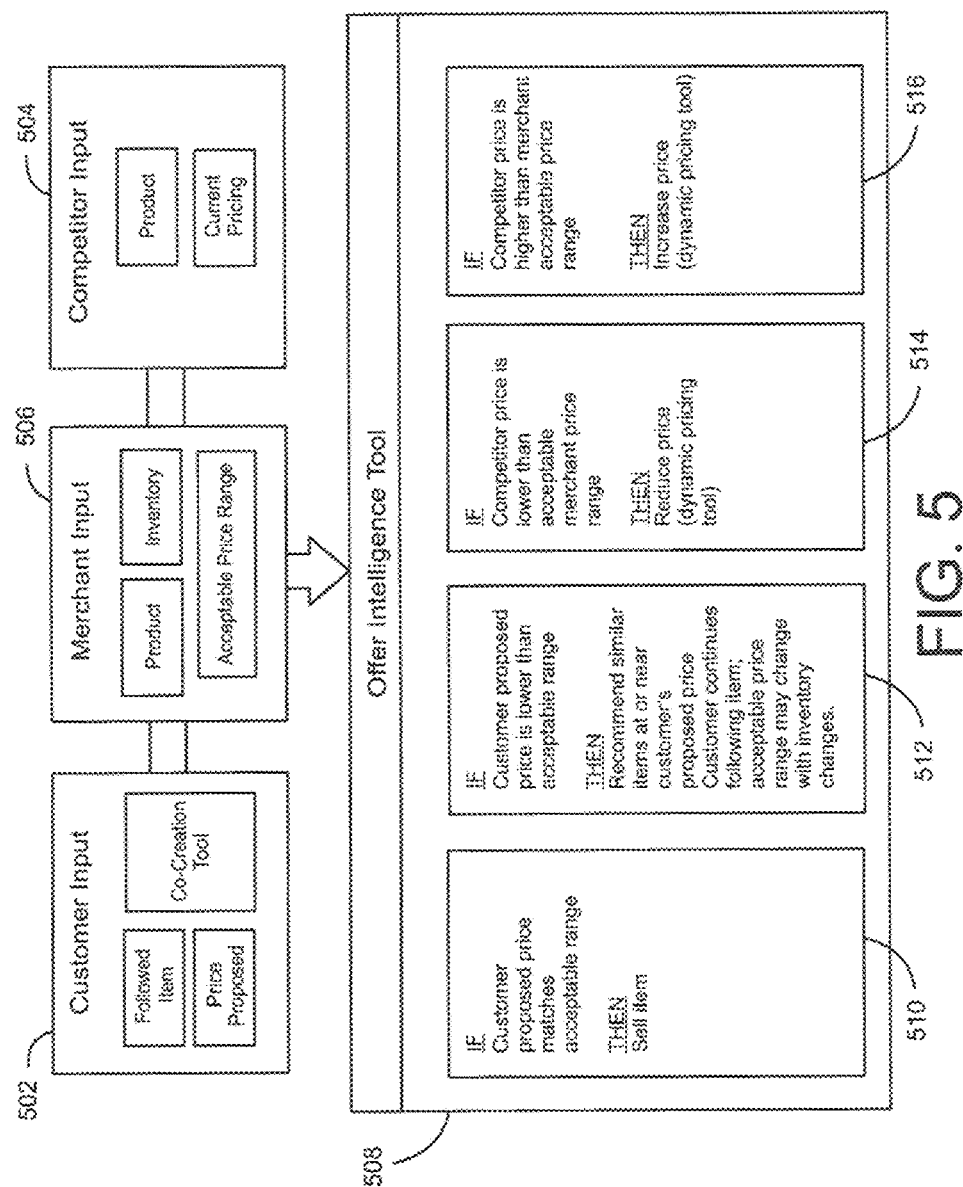

Turning to FIG. 5 and as noted above, the host retailer system will receive from the customer 502 input pertaining to an item to be followed which may further include a price that the customer would like to pay for the item. Input to the host retailer system may additionally include competitor input 504 for the item, such as current competitor pricing for the same or similar items, which competitor input may be provided to the system by the merchant, may be scraped from a competitor website, etc., as well as merchant input 506 for that item, such as item inventory level and an acceptable price range for the item. With this input, an offer intelligence tool 508 implemented by the host retailer system may proceed to make various determinations related to the customer's price tracking of and general interest in the item. By way of example only and without limitation, the offer intelligence tool 508 may perform various comparisons using the received inputs to perform one or more of the following:

1) determine 510 if the desired price for the item included in the customer input 502 is within or above the acceptable price range as included in the merchant input 506 and, if so, cause the system to take the steps necessary to proceed with a sale of the item to the customer at the desired price indicated in the customer input 502;

2) determine 512 if the desired price for the item included in the customer input 502 is lower than the acceptable price range as included in the merchant input 506 and, if so, cause the system to recommend to the customer (using an email communication of the like) other, similar items that are being offered for sale by the merchant at or near the customer's desired price;

3) determine 514 if the competitor's price for item as included in the competitor input 504 is lower than the acceptable price range as included in the merchant input 506 and, if so, cause the merchant's acceptable price range for the item to be downwardly adjusted whereupon the comparisons herein described may be repeated as necessary; and 4) determine 516 if the competitor's price for the item included as included in the competitor input 504 is higher than the acceptable price range as included in the merchant input 506 and, if so, cause the merchant's acceptable price range for the item to be upwardly adjusted whereupon the comparisons herein described may be repeated as necessary. In the case of 2) above, in the event that the customer does not proceed to purchase a similar item that was recommended to the customer, the price notifications will continue to be sent to the customer in the manner that was specified.

Figure 8:
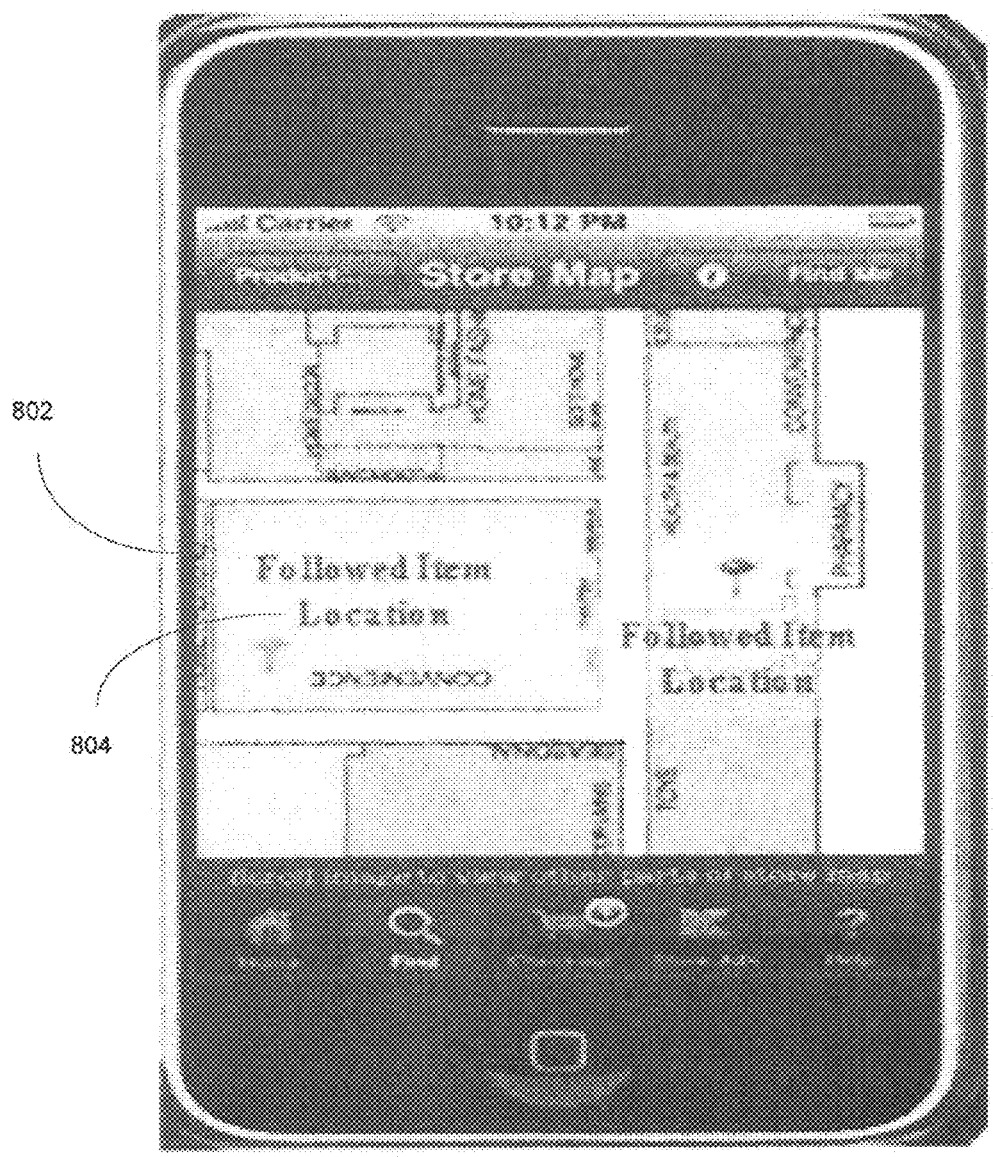
FIG. 8 illustrates an exemplary screen shot of a mobile device map showing item locations within a retail establishment.
Figure 9:
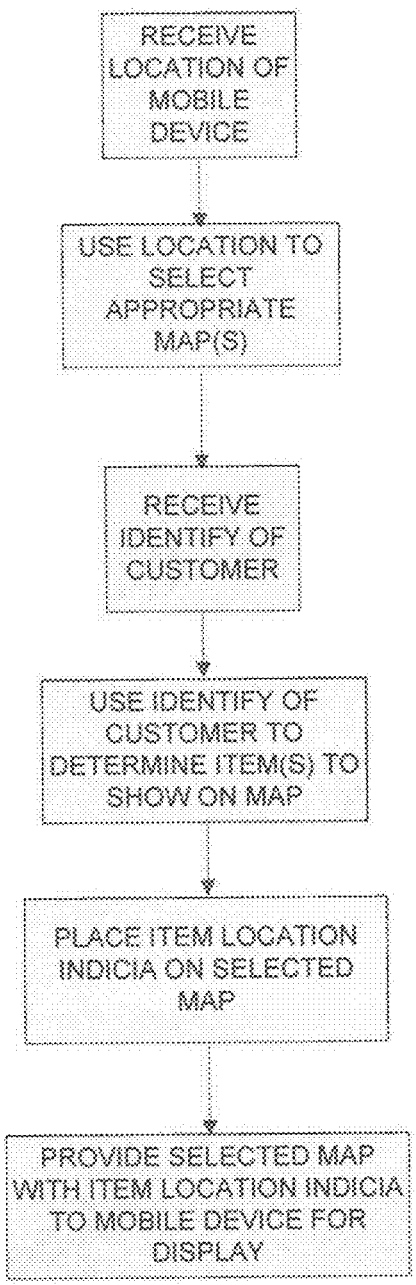
FIG. 9 illustrates an exemplary method for creating the mobile device map shown in FIG. 8.

In connection with following an item, a customer may also use a mobile device to locate the item within a retail establishment. For example, as illustrated in FIGS. 8 and 9, considering an instance where a customer has indicated to the system that they desire to follow the price of item "A," have made an offer for an item "A" which has been accepted by a retailer, etc., the customer may be provided with a map 802 of a retail establishment, e.g., an individual store, a mall, or the like, wherein the map provides for the customer an illustration of where within the retail establishment the customer may find item "A," i.e., the item that has been determined by the system to be of interest to the customer. While described in the context of an item "A" which a customer has expressly indicated a desire to purchase/follow, it will also be appreciated that items determined to be of interest to a customer may also or alternatively include items that have been selected for the customer by the system as being implicitly of interest to that customer, e.g., items often purchased with or otherwise compliment an item expressly identified by the customer, items of a type, genre, etc. that are similar to an item expressly identified by the customer, items that "friends" of the customer have expressed an interest in, etc. For use in displaying such a map 802, the customer may have downloaded into their mobile device a mobile "map" application using conventionally known technology, may be presented a map within a webpage/WAP page via a local area network at the retail location, or the like.

To inform the system which particular map to provide to the mobile device of the customer to thereby show the location of the one or more items that have been determined to be of interest to that customer, the system may receive GPS or other location information from the mobile device (which information, such as a street address, may be manually entered by the customer, determined by use of signal analysis, etc.). Such received information will be used by the system to select from a plurality of retail establishment maps a map that is appropriate for the customer which selected map will be returned to the mobile device for display. When provided with a map via a webpage/WAP page (e.g., accessed via a local area network while in a retail establishment), the retail establishment location of the mobile device will of course be known to the system and, as such, each local area network need only retrieve the one or more maps that are appropriate for that retail establishment when needed for display to the customer. Still further, a customer may be provided with a map for a given retail establishment in response to the customer docking their mobile device with (or otherwise establishing communication with) a kiosk or other computing device at a retail establishment which kiosk or other computing device will have access to one or more corresponding maps. It is also to be understood that the maps provided may be of an entire retail establishment, a portion of the retail establishment (e.g., departments or floors within a retail location), and the like without limitation. Still further, it will be appreciated that programming used to display such maps may provide the customer with the ability to zoom, scroll, etc. any maps so displayed.

To show within the maps the location of the one or more items determined to be of interest to the customer, e.g., a department, floor, aisle, shelf, and/or the like where an item may be positioned, a selected map is preferably provided with appropriate indicia—e.g., a "followed item location" marker 804 as shown in FIG. 8. The particular indicia to be included with a selected map to be displayed to a customer will therefore be selected using information which serves to identify the customer to the system, i.e., it will be appreciated that the identify of the customer corresponds to the items determined to be of interest to that customer. As above, the identify of the customer (which is used to identify items of interest to that customer and their location within a given retail establishment) may be provided to the system using information that is normally maintained on a mobile device (e.g., retrieved from a registry stored in a memory of the mobile device, a serial number stored in a memory of or otherwise carried on the mobile device, etc.), provided to the mobile device by the customer (e.g., typed in, read from a loyalty card, etc.), and/or the like.

It will be appreciated that these steps need not be followed in the order described to arrive at the same result.

As described above, when the user ultimately locates the item using a provided map, the user may, for example, use their mobile device to initiate a purchase of the item and delivery, pickup, etc. as desired.

While the system may provide static maps which merely provide an overhead view of a retail establishment, it is also contemplated that the mobile device could be tracked as the customer navigates through the store with the location of the customer relative to the items of interest being displayed. In this manner, a customer can be given guided directions to the item(s) of interest within the retail establishment. Furthermore, the maps can be in the form of three-dimensional images to assist the customer in navigating the store.

While specific embodiments of the invention have been described in detail, it will be appreciated by those skilled in the art that various modifications and alternatives to those details could be developed in light of the overall teachings of the disclosure. For example, it will be appreciated that the subject system may be used in connection with a registry application, such as bridal or baby registry, where a user would populate the registry using the mobile phone scanning device and the registry would be available on-line or in-store to facilitate purchasing of items. Accordingly, the particular arrangement disclosed is meant to be illustrative only and not limiting as to the scope of the invention which is to be given the full breadth of the appended claims and any equivalents thereof.

All references discussed within this application are hereby incorporated by reference in their entirety.

What is claimed is:

1. A computer-readable media embodied on a non-transient, physical memory device having stored thereon computer-executable instructions for providing a customer with a map to a location of at least one item within a retail establishment, the instructions performing steps comprising:
   storing information identifying at least one item previously selected by the customer for purchase;
   receiving information that is representative of a location of a mobile device;
   using the information representative of the location of the mobile device to select one or more maps corresponding to the retail establishment;
   receiving information that is representative of the customer, wherein the received information identifies the at least one item previously selected by the customer for purchase and one or more additional items for suggestion to the customer for purchase, based on the at least one item selected by the customer for purchase;
   using the information representative of the customer to include with the one or more selected maps corresponding to the retail establishment, indicia indicative of one or more locations within the retail establishment at which the at least one item previously selected by the customer for purchase and the one or more additional items suggested to the customer for purchase are located; and
   providing the one or more selected maps with the included indicia to the mobile device for display.

2. The computer-readable media as recited in claim 1, wherein the one or more additional items are items having a price that is being followed by the customer.

3. The computer-readable media as recited in claim 1, wherein the information that is representative of the customer is obtained from a loyalty card provided to the customer.

4. The computer-readable media as recited in claim 1, wherein the information that is representative of the customer is obtained from a memory store within the mobile device.

5. The computer-readable media as recited in claim 1, wherein the information that is representative of the location of the mobile device is automatically obtained by the mobile device.

6. The computer-readable media as recited in claim 5, wherein a global positioning satellite system is used to automatically obtain the information representative of the location of the mobile device.

7. The computer-readable media as recited in claim 1, wherein the information that is representative of the location of the mobile device is manually entered into the mobile device by the customer.

8. The computer-readable media as recited in claim 1, wherein the map further includes indicia showing a determined location of the mobile device.

9. The computer-readable media as recited in claim 8, wherein the instructions provide directions to the one or more locations within the retail establishment considering the determined location of the mobile device.

10. The computer-readable media as recited in claim 1, wherein the one or more locations within the retail establishment comprise departments within the retail establishment.

11. The computer-readable media as recited in claim 1, wherein the one or more locations within the retail establishment comprises aisles within the retail establishment.

12. The computer-readable media as recited in claim 1, wherein the one or more maps each comprise three-dimensional representations of the retail establishment.

13. The computer-readable media as recited in claim 1, wherein the one or more maps each comprise an overhead layout representation of the retail establishment.

14. The computer-readable media as recited in claim 1, wherein the retail establishment comprises a mall having a plurality of stores.

15. The computer-readable media as recited in claim 1, wherein the retail establishment comprises a single store.

16. The computer-readable media as recited in claim 1, wherein the received information identifies the one or more additional items for suggestion to the customer for purchase based on at least another item identified for purchase by at least one acquaintance of the customer.

17. A computer-readable media embodied on a non-transient, physical memory device having stored thereon computer-executable instructions for providing a customer with a map to a location of at least one item within a retail establishment, the instructions performing steps comprising:
    storing information identifying at least one item previously selected by the customer for purchase;
    receiving information that is representative of the customer, wherein the received information identifies the at least one item previously selected by the customer for purchase and one or more additional items for suggestion to the customer for purchase, based on the at least one item selected by the customer for purchase;
    identifying one or more maps corresponding to the retail establishment; and
    providing the one or more selected maps, including indicia indicative of one or more locations within the retail establishment at which the at least one item previously selected by the customer for purchase and the one or more additional items suggested to the customer for purchase are located, to the mobile device for display.

18. The computer-readable media as recited in claim 17, wherein the one or more additional items comprise items having a price that is being followed by the customer.

19. The computer-readable media as recited in claim 17, wherein the one or more additional items comprise items that are to be purchased with the at least one item previously selected by the customer for purchase.

20. The computer-readable media as recited in claim 17, wherein the information that is representative of the customer is obtained from a loyalty card provided to the customer.

21. The computer-readable media as recited in claim 17, wherein the information that is representative of the customer is obtained from a memory store within the mobile device.

22. The computer-readable media as recited in claim 17, wherein:
   a global positioning satellite system is used to automatically obtain information representative of a location of the mobile device; and
   the identifying of the one or more maps corresponding to the retail establishment is based on the information representative of the location of the mobile device.

23. The computer-readable media as recited in claim 22, wherein the information that is representative of the location of the mobile device is manually entered into the mobile device by the customer.

24. The computer-readable media as recited in claim 17, wherein the one or more maps further includes indicia showing a determined location of the mobile device.

25. The computer-readable media as recited in claim 24, wherein the instructions provide directions to the one or more locations within the retail establishment considering the determined location of the mobile device.

26. The computer-readable media as recited in claim 17, wherein the one or more locations within the retail establishment comprise one or both of departments within the retail establishment and/or aisles within the retail establishment.

27. The computer-readable media as recited in claim 17, wherein the one or more maps each comprise three-dimensional representations of the retail establishment.

28. The computer-readable media as recited in claim 17, wherein the one or more maps each comprise an overhead layout representation of the retail establishment.

29. The computer-readable media as recited in claim 17, wherein the retail establishment comprises one of a mall having a plurality of stores and a single store.

30. The computer-readable media as recited in claim 17, wherein the received information identifies the one or more additional items for suggestion to the customer for purchase based on at least another item identified for purchase by at least one acquaintance of the customer.

* * * * *